United States Patent
Ledoux et al.

(10) Patent No.: US 10,591,376 B2
(45) Date of Patent: Mar. 17, 2020

(54) METHOD FOR DETECTING AND SIGNALLING THE UNDER-INFLATION STATE OF A TIRE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Thomas Ledoux, Clermont-Ferrand (FR); Denis Martin, Clermont-Ferrand (FR); Guillaume Heredia, Clermont-Ferrand (FR); Alexandre Pernot, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 88 days.

(21) Appl. No.: 15/535,150

(22) PCT Filed: Dec. 11, 2015

(86) PCT No.: PCT/EP2015/079458
§ 371 (c)(1),
(2) Date: Jun. 12, 2017

(87) PCT Pub. No.: WO2016/096664
PCT Pub. Date: Jun. 23, 2016

(65) Prior Publication Data
US 2017/0350781 A1    Dec. 7, 2017

(30) Foreign Application Priority Data

Dec. 17, 2014 (FR) .................... 14 62592

(51) Int. Cl.
*G01L 17/00* (2006.01)
*G01M 17/02* (2006.01)
(Continued)

(52) U.S. Cl.
CPC ............ *G01L 17/005* (2013.01); *G01B 21/02* (2013.01); *G01L 1/18* (2013.01); *G01M 17/02* (2013.01)

(58) Field of Classification Search
CPC ........ G01L 17/005; G01L 1/18; G01M 17/02; G01B 21/02
See application file for complete search history.

(56) References Cited

U.S. PATENT DOCUMENTS

| 3,183,481 A | 5/1965 | McCrory ........................ 340/52 |
| 5,554,907 A | 9/1996 | Dixon ........................... 310/339 |

(Continued)

FOREIGN PATENT DOCUMENTS

| CN | 101124469 A | 2/2008 |
| CN | 102145639 A | 8/2011 |

(Continued)

OTHER PUBLICATIONS

Machine translation of DE102012205495A1 (Year: 2013).*
(Continued)

*Primary Examiner* — Matthew G Marini
(74) *Attorney, Agent, or Firm* — Venable LLP

(57) ABSTRACT

A method for detecting an underflation state of a tire fitted on a vehicle is provided. The method includes determining a first contact patch measurement of a first tire fitted on the vehicle, determining a second contact patch measurement of a second tire fitted on the vehicle, and comparing the first and second contact patch measurements. An underinflation situation is inferred if a difference between the first and (Continued)

second contact patch measurements is greater than a predetermined signalling threshold.

20 Claims, 3 Drawing Sheets

(51) Int. Cl.
*G01B 21/02* (2006.01)
*G01L 1/18* (2006.01)

(56) References Cited

U.S. PATENT DOCUMENTS

| | | | |
|---|---|---|---|
| 5,942,681 A * | 8/1999 | Vollenweider | G01L 17/005 73/146 |
| 6,246,317 B1 * | 6/2001 | Pickornik | B60C 23/007 340/442 |
| 6,823,728 B1 * | 11/2004 | Barnes | G01L 17/005 73/146 |
| 7,661,300 B2 | 2/2010 | Sinnett et al. | |
| 8,742,911 B2 | 6/2014 | Wagner et al. | |
| 2002/0169439 A1 | 11/2002 | Flaherty | 604/891.1 |
| 2008/0084180 A1 | 4/2008 | Hasegawa | 320/112 |
| 2008/0256815 A1 | 10/2008 | Schafer | 33/739 |
| 2008/0302177 A1 | 12/2008 | Sinnett et al. | |
| 2009/0000370 A1 | 1/2009 | Lionetti et al. | 73/146 |
| 2010/0011856 A1 | 1/2010 | Nagata | 73/504.12 |
| 2010/0139383 A1 | 6/2010 | Haswell et al. | 73/146 |
| 2011/0193696 A1 | 8/2011 | Wagner et al. | |
| 2014/0288859 A1 | 9/2014 | Wittman | |
| 2015/0090022 A1* | 4/2015 | Uffenkamp | G01L 17/005 73/146 |
| 2016/0153763 A1 | 6/2016 | Ledoux et al. | G01M 17/02 |
| 2016/0161243 A1 | 6/2016 | Ledoux et al. | G01B 7/26 |
| 2016/0169657 A1 | 6/2016 | Ledoux et al. | G01B 7/26 |
| 2017/0038278 A1 | 2/2017 | Ledoux et al. | G01M 17/20 |
| 2017/0322012 A1 | 11/2017 | Ledoux et al. | |
| 2017/0322117 A1 | 11/2017 | Ledoux et al. | |
| 2017/0341659 A1 | 11/2017 | Duvernier et al. | |
| 2017/0350792 A1 | 12/2017 | Ledoux et al. | |
| 2018/0009271 A1 | 1/2018 | Ledoux et al. | |

FOREIGN PATENT DOCUMENTS

| | | | |
|---|---|---|---|
| CN | 104160258 A | 11/2014 | |
| CN | 104204756 A | 12/2014 | |
| DE | 18 09 459 A1 | 6/1970 | |
| DE | 102012205495 A1 * | 10/2013 | G01L 17/005 |
| DE | 20 2014 001 427 U1 | 4/2014 | |
| EP | 0 469 948 A1 | 2/1992 | |
| EP | 0 656 269 A1 | 6/1995 | |
| FR | 2 201 511 | 4/1974 | |
| GB | 2 443 965 A | 5/2008 | |
| GB | 2 512 411 A | 10/2014 | |
| WO | WO 2006/098714 A1 | 9/2006 | |
| WO | WO 2007/059935 A1 | 5/2007 | |
| WO | 2008/156446 A1 | 12/2008 | |

OTHER PUBLICATIONS

Jan. 30, 2019 Chinese Search Report in Chinese Patent Appln. No. 201580069047.6.
Feb. 22, 2019 Chinese Official Action in Chinese Patent Appln. No. 201580069047.6.
Mar. 7, 2016 International Search Report and Written Opinion in International Patent Appln. No. PCT/EP2015/079458.
International Search Report issued by WIPO dated Mar. 7, 2016, in connection with International Application No. PCT/EP2015/079458 (with English translation attached).
M. Devernier, U.S. Appl. No. 15/534,786, filed Dec. 16, 2015.
T. Ledoux, U.S. Appl. No. 15/535,138, filed Dec. 11, 2015.
T. Ledoux, U.S. Appl. No. 15/535,276, filed Dec. 16, 2015.
T. Ledoux, U.S. Appl. No. 15/535,210, filed Dec. 11, 2015.
T. Ledoux, U.S. Appl. No. 15/535,251, filed Dec. 11, 2015.
Nov. 5, 2019 Chinese Official Action in Chinese Patent Appln. No. 201580069047.6.

* cited by examiner

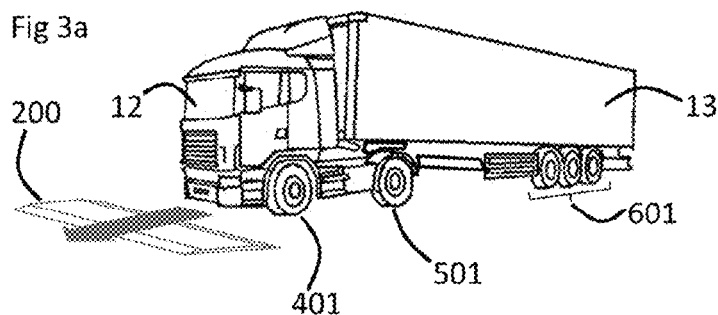
Fig 3a
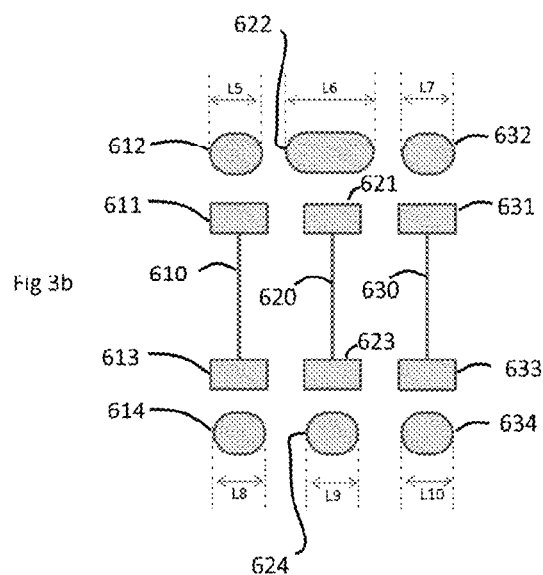
Fig 3b
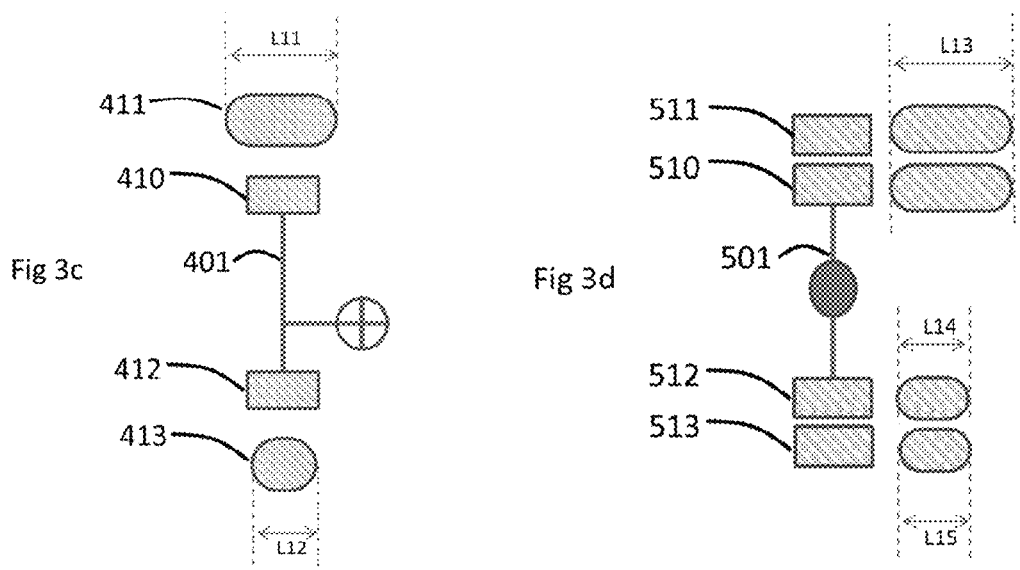
Fig 3c
Fig 3d

METHOD FOR DETECTING AND SIGNALLING THE UNDER-INFLATION STATE OF A TIRE

TECHNICAL FIELD

The present invention relates to a system for detecting and signalling the underinflation of a vehicle tire. More particularly, the present invention relates to an external system, that is to say one not on board the vehicle.

RELATED ART

The term "underinflation" means a situation in which the pressure of the tire is lower than a recommended pressure, for example depending on the characteristics of the tire, on the characteristics of the vehicle or on the activity of the vehicle. In the rest of the description, the terms "underinflation" and "underpressure" will be used interchangeably.

In order to monitor the inflation pressure of the tires of a motor vehicle, systems fitted directly on the wheels of vehicles are conventionally known, which determine the pressure by means of a pressure sensor and which then send the information by radiofrequency to the central electronic unit of the vehicle. The driver is warned, in the event of underpressure, by a warning light fitted on the dashboard of the vehicle.

Also known are systems not on board the vehicle for measuring the contact pressure of the tires with the ground and estimating from this measurement the inflation pressure of said tire.

Finally, manual manometers are known which allow the pressure level of the tires to be verified via a simple temporary connection of these devices to the inflation valve of the wheels of the vehicle.

The present invention aims to provide a system, notably usable by vehicle fleet managers, which can be included in a more general system for diagnosis of the state of a vehicle and of its tires. However, as things stand, none of the known systems allows aggregation with other information relating to the vehicle, including the pressure of the tires.

Therefore, the object of the present invention is to provide a method and a system for detecting and signalling in the event of underpressure of a tire of a vehicle which is ergonomic both for a vehicle driver and for a vehicle fleet manager.

BRIEF DESCRIPTION OF THE INVENTION

Therefore, the invention relates to a method for detecting the underinflation state of a tire fitted on a vehicle, the method comprising the following steps:
  the step of determining a first contact patch measurement of a first tire fitted on the vehicle,
  the step of determining a second contact patch measurement of a second tire fitted on the vehicle,
  the step of comparing the first and second contact patch measurements and of inferring an underinflation situation therefrom if the difference between the two measurements is greater than a predetermined signalling threshold.

Thus, a difference in inflation pressure between two tires on one and the same axle is detected as soon as the contact patch length, or area, of one of the tires is less than the contact patch length or area of the tire situated at the other end of said axle.

However, it has been found that in some situations it is possible for this difference in length and/or area to be due to poor distribution of the load transported by the vehicle. In this case, the contact patch length or area of a tire can be increased simply by a load effect, without said tire being underinflated.

In order to remedy this and avoid any false detection, in a preferred embodiment, the method comprises the step of applying a corrective factor to the first and/or second measurement before the comparison step. This corrective factor is, for example, a multiplying coefficient less than one, applied to the greatest contact patch length.

It has also been found that an underpressure of a tire on a semi-trailer axle can translate into an increase in the length and the area of the contact patch of said tire but can also cause variations in the lengths and areas of the tires situated on the other axles of the semi-trailer. This phenomenon is all the more pronounced, the greater the underpressure of the underinflated tire.

In this case, it can be useful to improve the analysis of the contact patch lengths and areas of the tires present on the semi-trailer in order to identify the tire that is, most probably, in an underinflation situation, and thereby to avoid false alarms being sent to the user of the vehicle.

Thus, in a preferred embodiment, firstly the contact patch lengths, or areas, of the tires situated on each side of the semi-trailer are averaged; and secondly the two values obtained are compared, with the higher value being found, in order to determine the side of the semi-trailer on which there might be an underinflated tire.

Once the side of the semi-trailer on which a tire in an underinflation situation is most probable has been identified, the contact patch lengths or areas of the tires situated on said side are compared. The tire for which the underinflation situation is most probable is then the one having the greatest contact patch length or area.

As in the previous cases, it is possible to apply a corrective factor to the contact patch lengths or areas during this final comparison, in order to avoid any false detections.

It has also been found that an underpressure of a tire on an axle equipped with twin-mounted tires can translate into an increase in the length and the area of the contact patch of said tire but can also cause variations in the lengths and areas of the tires situated on the tires of the same axle. This phenomenon is all the more pronounced, the greater the underpressure of the underinflated tire.

To this end, the invention also relates to a method intended to be applied to a vehicle having at least one axle with the first and second tires twin-mounted on a first side of the vehicle and a third and a fourth tire twin-mounted on the second side of the vehicle. In addition to the above-described steps, the method comprises the following steps:
  the step of determining a third and fourth contact patch measurements of the third and fourth tires,
  the step of calculating a first and a second average of the contact patch measurements of the tires situated on the first and the second side, respectively, of the vehicle,
  the step of comparing the first and the second average in order to determine a side of the vehicle that has a tire in an underinflation situation.

In another embodiment, the method comprises the step of sending a warning signal to the driver of the vehicle and/or to a remote server. Preferably, the step of warning the driver is implemented following several successive detections of an underinflation situation on one and the same tire.

Specifically, it has been found that, on some vehicles, notably those that transport freight, and thus high weight loads, it is quite possible for differences in contact patch lengths or areas to arise on account of an irregular distribution of the weight in said vehicle.

It is thus useful to take this potential source of error into account before warning the driver. In one example, several measurements are made at different times in order to have readings taken under different load conditions. If these different measurements all lead to the detection of a potential underpressure on the same time, the probability of having detected an actual underpressure increases and it becomes possible to warn the driver.

Preferably, the signalling threshold is determined depending on an activity of the vehicle, for example its type of load, and/or the mounting of the tire, and/or the position of the tire on said vehicle.

As in the previous cases, it is also possible to apply a corrective factor to the averages of the contact patch lengths or surfaces calculated on either side of the axle provided with twin-mounted tires, before they are compared. This also makes it possible to avoid false detections which could be due to an unbalanced load in the vehicle. This corrective factor is, for example, a multiplying coefficient less than one, applied to the greatest average contact patch length or area.

The invention also relates to a method intended to be applied to a vehicle having at least a third and fourth tires mounted on at least one additional axle without twin-mounted tires, the method also comprising the following steps:
the step of determining all of the contact patch measurements of all of the tires mounted on the non-twin-mounted axles,
the step of calculating a first and a second average of the contact patch measurements of the tires situated on the first and the second side, respectively, of the vehicle,
the step of comparing the first and the second average in order to determine a side of the vehicle that has a tire in an underinflation situation.

In one particular embodiment, a method according to the invention comprises the step of comparing the contact patch measurement of one tire of a vehicle to the average of the contact patch measurements of the other tires of the vehicle. In this case, the method comprises the step of warning the driver if the contact patch measurement of one tire is, for example, greater than or equal to twenty-five percent of the average of the other contact patch measurements of the tires of the same vehicle.

In practice, this percentage, which is a safety coefficient that makes it possible to avoid the sending of false alarms, can be adapted to the type of vehicle and the type of activity for which it is employed.

For example, in the case of trailers or semi-trailers, it is well known that the activities of courier services and mail transport services are activities in which the freight is low weight and distributed regularly inside said trailers or semi-trailers. In this case, this percentage may be lower than the abovementioned twenty-five percent. Conversely, the activities of heavy machinery, for example the transport of machine tools, can lead to irregular mass distributions between the front and the rear of a semi-trailer or between the left-hand and right-hand sides of said semi-trailer. In this case, this percentage may be higher than the abovementioned twenty-five percent.

Generally, regardless of the method of detecting an underpressure situation according to a subject of the invention, a corrective factor can be applied to each of the contact patch measurements, or to each of the averages calculated from these contact patch measurements, or to each result of a calculation carried out on the basis of the contact patch measurements of the tires of the vehicle before a comparison is carried out. This makes it possible to avoid any false detection of an underpressure situation. The coefficient to be applied can be adjusted beforehand depending on the type of vehicle, the type of axle and/or the position of each tire of said vehicle for which a contact patch is measured in order to detect possible underpressure situations.

To this end, in a preferred embodiment, a method according to the invention is implemented using a system for evaluating the contact patch of a vehicle, the system comprising:
a system for evaluating the state of a tire having a housing placed on the ground,
means for determining at least one time for the vehicle to cross over a crossing point of the housing of the evaluation system, and
means for calculating, depending on the crossing time of the vehicle and on the speed of the vehicle, at least one local contact patch length of at least one tire of the vehicle.

Preferably, the system for evaluating the state of a tire is a system for measuring wear that has a housing placed on the ground, in which the following are advantageously fitted:
A device for detecting tire wear,
A device for detecting the presence of a tire on the housing, and
Electronic means for activating the wear detecting device during the detection of the presence of a tire.

The wear detecting device preferably implements a sensor that is positioned inside the housing, close to a face of the housing that is intended to be in contact with the surface of the tire, and is able to measure the distance between said sensor and the metal reinforcements making up the tire.

The sensor has, for example, a static or alternating magnetic field source and an adjacent sensitive element, the source being a coil or a permanent magnet and the sensitive element being a sensor, the output signal of which can, for example, depend on the level of the local magnetic induction field. In this case, the sensitive element is positioned such that the intensity of the magnetic field varies when the distance decreases. The sensitive element is preferably chosen from the group consisting of Hall-effect or magnetoresistive sensors.

In another example, the sensor can be an eddy current sensor.

Preferably, the system for evaluating the contact patch is configured such that the means for measuring a time for the vehicle to cross over a crossing point of the housing of said evaluation system have a line of sensors fitted perpendicularly to the direction in which the vehicle runs over the housing. The sensors that are employed for this purpose are, for example, the sensors of a wear measuring device, as explained above.

Preferably, the system for evaluating the contact patch comprises means for calculating the speed of the vehicle.

For example, the speed is calculated depending on the time for the vehicle to cross over the housing of the system for evaluating the state of a tire, and on dimensional data of the housing and/or of the vehicle.

In one particular embodiment, the system for evaluating the contact patch comprises means for storing dimensional data of the housing that are used for calculating the speed. These dimensional data comprise, notably but not exclusively, the distances between different elements incorporated in the housing, for example piezoelectric sensors, piezoelectric cables, or electrodes covered in piezoelectric paint. The term "distance" is understood here as meaning the distance between the respective projections of the elements onto one and the same plane, parallel to the ground on which the vehicle of which the speed is calculated is running.

In one particular embodiment, the system for evaluating the contact patch employs means for identifying the vehicle that are used for calculating the speed. These means are, for example, an RFID reader, integrated into or on the housing, or close thereto. Such a reader can make it possible to read the identifier of an RFID chip integrated into one or more tires of the vehicle or affixed to the chassis of said vehicle. This RFID chip reader is preferably linked by telecommunication means to a remote database, making it possible to establish a link between an RFID chip and a tire and/or a vehicle. In this way, it is possible to exchange dimensional and qualitative information about the identified vehicle with said remote database.

The dimensional information comprises, for example, the size of the tires, the wheelbase, the front track or the rear track of the vehicle.

The qualitative information comprises, for example, the type of vehicle, the use made thereof, and more broadly any type of information for determining which corrective factor needs to be applied to each contact patch, to each average or to each result of a calculation carried out on the basis of the contact patch measurements obtained from the system for evaluating the contact patch.

In one particular embodiment, the system for evaluating the contact patch employs the device for detecting the presence of a tire belonging to the system for evaluating the state of a tire, in order to make it possible to calculate the speed. Said device for detecting the presence of a tire comprises at least one element from the group comprising: a sensor of the ferroelectret (PP, CYTOP, etc.) type, an organic piezoelectric sensor, a piezoelectric cable and/or fibre, a piezoelectric transducer, a piezoelectric bimetallic strip or a sensor in the form of an inorganic piezoelectric composite applied to a substrate. The piezoelectric composite can, for example, be a paint with an addition of barium titanate, an oxide known for its ferroelectric properties. Any other element having ferroelectric properties, such as TGS, PZT, BST, KNbO3, LiNbO3, LiTaO3, for example, this list not being limiting, could be used as an additive to a conventional paint to form a piezoelectric composite that is usable within the scope of the present invention.

In another particular embodiment, the device for detecting the presence of a tire comprises at least one element from the group comprising: an accelerometer, an omnidirectional vibration or tilt sensor (for example of the SQ-SEN-200 type from Signal Quest), or a strain gauge adhesively bonded at one point on the structure of the housing.

Preferably, the system also comprises means for determining several local contact patch lengths for each tire of the vehicle, each local contact patch length being determined depending on the time taken for the tire to cross over a sensor of the line of sensors.

Preferably, the system comprises means for reconstructing the contact patch shape of the tire depending on the local contact patch lengths of said tire.

In one example, these reconstructing means comprise means for transmitting local contact patch lengths to a remote server.

In another example, these reconstructing means also comprise means for the temporal resetting of the local contact patch lengths with respect to one another, depending on a temporal offset introduced during the determination of the crossing times corresponding to each local contact patch length.

BRIEF DESCRIPTION OF THE DRAWINGS

Further advantages and embodiments of the invention will become apparent from the non-limiting detailed description of the figures, notably:

FIGS. 3a to 3d show an example of the application of a method according to the invention for a heavy goods vehicle.

DETAILED DESCRIPTION OF THE INVENTION

Figure 1A:
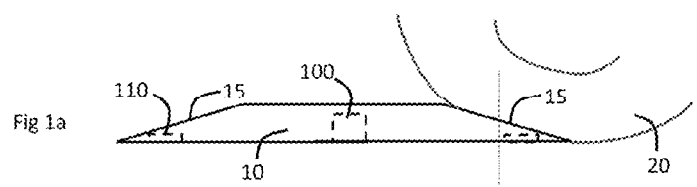
FIGS. 1a, 1b, 1c and 1d, which show an example of a system for evaluating the contact patch of a tire, making it possible to implement a method according to the invention.
Figure 1B:
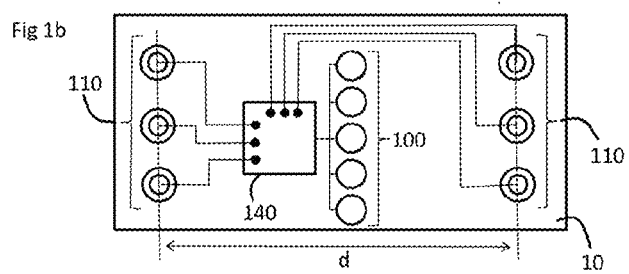

The system for evaluating the contact patch of a tire that is shown in FIGS. 1a and 1b is made up:

- of a housing 10 made up of two access ramps 15 and a horizontal wear measuring zone situated between the two access ramps 15.
- of two devices for detecting the presence of a tire that are each made up of three piezoelectric sensors 110 positioned along a line transverse to the running direction of a vehicle arriving on the housing. In this example, the piezoelectric sensors are buzzers adhesively bonded to the structure of the housing 10.
- of a line of wear measuring sensors 100 positioned along a line transverse to the running direction of the vehicle arriving on the housing 10. These wear measuring sensors may equally well be variable-reluctance sensors or eddy current sensors. Alternatively, these electromagnetic wear sensors can also be replaced with optical sensors that apply the principle of laser triangulation.
- of processing electronics 140 to which the wear measuring sensors 100 and the sensors 110 for detecting the presence of a tire are connected. In this example, the processing electronics 140 also contain an RFID reader for reading the RFID chips integrated into the tires or adhesively bonded to the vehicle of which the tire wear and speed are measured and of which the contact patches of the tires are evaluated.

While a tire 20 is crossing the housing 10 of the wear measuring system, the presence of the tire is first of all detected by a first line of sensors for detecting the presence of a tire, then, when the tire leaves the housing 10 of the wear measuring system, its presence is detected by a second line of sensors for detecting the presence of a tire. With the distance between the two devices for detecting the presence of a tire being known, it is then possible to calculate the speed of the tire by way of a very simple formula: Average speed=d/t0.

In this formula, the distance d is the distance between the two transverse lines of sensors 110 for detecting the presence of a tire, and the time t0 is the time that has passed between the detection of the tire by the first sensor for detecting the presence of a tire and the detection thereof by the second sensor for detecting the presence of a tire.

Figure 1C:
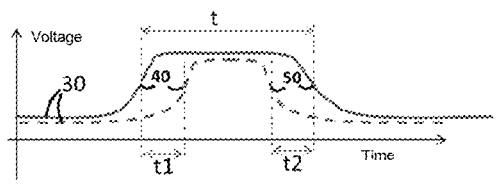

FIG. 1c shows, by way of solid and broken lines, two examples of signals 30 picked up at the output of two wear measuring sensors 100 while a tire crosses vertically above said wear measuring sensors 100. With the speed of the tire being known, it is thus very easy to measure the local length of the contact patch of the tire, vertically above the wear sensor in question. In the case of the sensor of which the output signal is shown by way of solid lines, the formula to be applied is:

Local CP length=Average speed*$t$=$d$*$t$/$t0$

In this formula, the value of the time t is measured by means of the processing electronics 140, which are provided, for example, with threshold detection. The time t is thus the time that passes between the first crossing of the threshold 40 by the output signal of the wear measuring sensor in question and the second crossing of the threshold 50 by the output signal of the wear measuring sensor in question.

As indicated above, in this example, use is made of a line of wear measuring sensors 100, installed perpendicularly to the running direction of the vehicle, for measuring the tire wear while a vehicle crosses over.

With the sensors that make up this line of wear measuring sensors 100 advantageously being close enough to one another, it is possible to carry out several wear measurements across the contact patch width.

For example, in the case of a tread with a width of twenty centimetres, if the sensors are disposed every two centimetres along a line transverse to the running direction of the tire, at least nine sensors may carry out a wear measurement across the width of said tire. In this case, nine local contact patch length measurements may be carried out as described above.

Once the local contact patch length measurements have been carried out, they are transmitted, for example, to a remote server using transmission means, for example by radiofrequency, incorporated into the processing electronics 140. It is thus possible to employ means for reconstructing the shape of the contact patch and to make use of this shape, for example by displaying it on a website intended for a vehicle fleet manager.

Figure 1D:
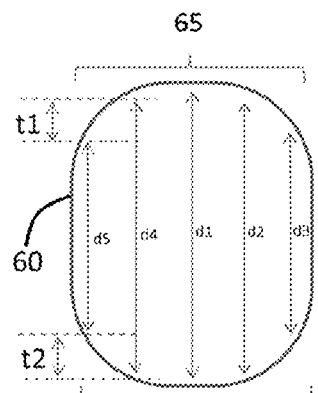

FIG. 1*d* shows an example of a contact patch 60 reconstructed by this method. In this example, the tire in question has a sufficiently wide tread to allow five local contact patch length measurements to be carried out across the width of the contact patch of said tire.

In this example, the lengths d1, d2, d3, d4 and d5 are the local contact patch lengths measured with the aid of the wear sensors, as described in FIGS. 1*a* and 1*b*.

During the arrival of a tire on the system described in FIGS. 1*a* and 1*b*, the output signals of the sensors 100 that are useful for measuring wear, since they are disposed facing the contact patch of the tire, will not all simultaneously cross the threshold 40 indicated in FIG. 1*c*. This temporal offset t1 is illustrated in FIG. 1*c*, between the two output signals 30.

Similarly, these output signals 30 will not simultaneously cross the threshold 50 indicated in FIG. 1*c*, either. In the case set out in FIG. 1*c*, a time t2 passes between the two crossings of the threshold 50.

This is explained by the shape of the contact patch of the tires, which is not always a perfect rectangle but can, for example, have a more rounded shape, for example in its front part 65 and in its rear part 66, as the drawing in FIG. 1*d* shows.

In this case, in order to reconstruct the contact patch, it is useful to take these temporal offsets t1 and t2 between all of the output signals of the wear sensors into account in order that the actual shape of the contact patch can be represented correctly, as is the case in FIG. 1*d*.

In FIG. 1*d*, the local contact patch lengths d5 and d4 correspond to the output signals 30 set out in FIG. 1*c*. The solid-line curve 30 corresponds to the local contact patch length d4 and the broken-line curve 30 corresponds to the local contact patch length d5. In order to illustrate the effect of the temporal offsets t1 and t2 in FIG. 1*c* on the geometry of the contact patch 60, the offsets t1 and t2 have been transferred from FIG. 1*c* to FIG. 1*d*.

Figure 2A:
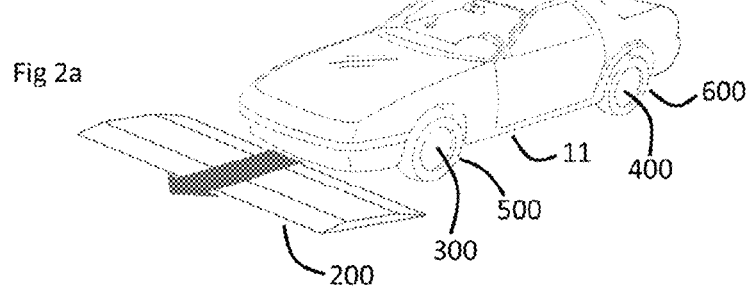
FIGS. 2a and 2b show an example of the application of a method according to the invention for a passenger vehicle.
Figure 2B:
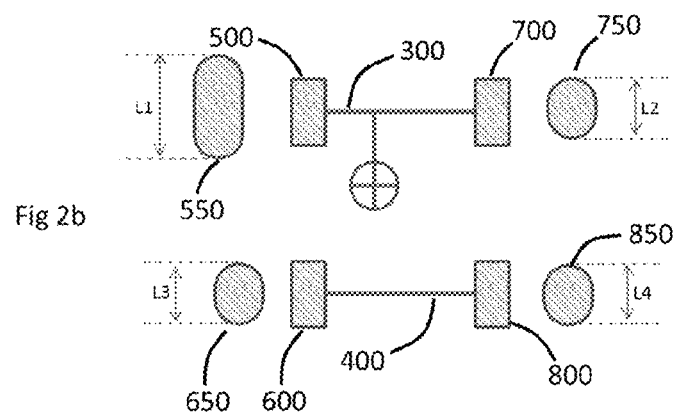

FIGS. 2*a* and 2*b* show the result of the contact patch shape and length measurements obtained when a passenger vehicle 11 provided with two axles 300 and 400 crosses over a wear measuring system 200 having the same functionalities as the system 10 described in FIGS. 1*a* and 1*b*.

In the case of FIGS. 2*a* and 2*b*, the tire 500 situated at the left-hand end of the axle 300 is in an underpressure situation. The tire 700 situated at the other end of the axle 300 is inflated at nominal pressure.

FIG. 2*b* shows the contact patch shapes 550, 650, 750 and 850 of the tires 500, 600, 700 and 800, respectively. In this example, the length L1 of the contact patch 550 of the tire 500 is greater than the length L2 of the contact patch 750 of the tire 700.

In this example, it is possible to detect the underinflation by comparing the contact patch lengths L1 and L2. Alternatively, it is also possible to compare the area S1 of the contact patch 550 with the area S2 of the contact patch 750.

In the case of FIGS. 2*a* and 2*b*, in order to avoid false alarms being sent, a probable underpressure of the tire 500 will preferably be signalled to the user if the product of S1 multiplied by a coefficient x is greater than or equal to S2 or if the product of L1 multiplied by a coefficient y is greater than or equal to L2. In these formulae, x and y are coefficients preferably less than one, the value of which may advantageously be fixed depending on the type of vehicle or the use thereof.

If the tire 700 were to be underinflated, it would be necessary to reverse the above formulae and warn the driver if the product of S2 multiplied by a coefficient x is greater than or equal to S1 or if the product of L2 multiplied by a coefficient y is greater than or equal to L1.

In order to detect a significant underpressure of a tire situated on the rear axle 400 of the passenger vehicle 11, a comparison of the lengths, or areas, of the contact patches of the tires 600 and 800 situated on either side of the axle 400 will be carried out.

FIGS. 3*a*, 3*b*, 3*c* and 3*d* show the result of contact patch length measurements obtained when a train made up of a tractor unit 12 and a semi-trailer 13 crosses over a wear measuring system 200 as described in FIG. 2*a*.

In these examples, the tractor unit 12 is made up of a front axle 401 and a rear axle 501 and the semi-trailer 13 is made up of a group of three axles 601. Moreover, the rear axle 501 of the tractor unit 12 is provided with two "twin-mounted" tires at each of its ends.

In the examples in FIGS. 3*a*, 3*b*, 3*c* and 3*d*, different tire underinflation situations are illustrated:

FIG. 3*b* shows the result of contact patch length measurements when the tire 621 on the central axle 620 of the semi-trailer 13 is in an underinflation situation.

FIG. 3*c* shows the result of contact patch length measurements when the tire 410 on the axle 401 of the tractor unit 12 is in an underinflation situation.

FIG. 3*d* shows the result of contact patch length measurements when the tire 510 on the axle 501 of the tractor unit 12 is in an underinflation situation.

In the case of FIG. 3*b*, the tire 621 situated at the right-hand end of the axle 620 of the semi-trailer 13 is in an underpressure situation. This underpressure can be detected by simply comparing the contact patch lengths, or areas, of the tires situated on either side of the same axle. Thus, in this example and to a first approximation, it is sufficient, for example, to compare the lengths L6 and L9 of the contact patches of the tires 621 and 623 in order to detect the probable underpressure of the tire 621.

In the case of the example illustrated in FIG. 3b, if the average value of the contact patch lengths on the right-hand side of the semi-trailer is calculated, a higher value will be obtained than in the case in which the same calculation is carried out for the left-hand side of the semi-trailer, since the tire 621 is situated on the right-hand side of said semi-trailer.

In a second step, on the side having the highest average contact patch length value, the tire which is least inflated can be determined by selecting the one for which the contact patch length, or area, value is the highest.

A final, more simple, method consists in directly selecting the least inflated tire by finding the highest contact patch length, or area, value from all of the tires of the semi-trailer.

In any case, since these tires are used on a semi-trailer used for transporting freight, the contact patch lengths, or areas, of the tires positioned on the axles 610, 620 and 630 are sensitive to the distribution of weights in said semi-trailer.

In order to remedy this problem, the decision can be taken to warn the driver only when the comparison of the contact patch lengths of the tires situated on either side of the axle results in a difference greater than x %, the coefficient x being fixed taking the type of freight transported by the vehicle in question into account.

For example, in the case of tanker transport, it is not possible to have poor load distribution between the right and the left of the semi-trailer. In this case, the coefficient x may be less than in situations in which poor load distribution between the left and the right is possible.

In the case of FIG. 3c, the tire 410 situated on the right-hand side of the axle 401 of the tractor unit 12 is in an underpressure situation. This underpressure can be detected by simply comparing the contact patch lengths, or areas, of the tires situated on either side of said axle 401.

In the case of the front axles of the tractor unit, most of the weight resting on these axles comes from the engine, which is situated vertically above said axles. Thus, the share of the load transported, which has an influence on the contact patch length or area of the tires on these axles, is very low given the weight of the tractor unit itself, and this results in much greater sensitivity of the evaluation of underpressure by comparing the contact patch length or area.

Thus, in this example, it will be possible to warn the driver as soon as a minimum difference arises between the contact patch lengths L11 and L12, or corresponding areas, of the two tires 410 and 413 on the axle 401.

By comparison with the example in FIG. 3b, the "safety coefficient" percentage for avoiding the sending of false alarms may be fixed at ten percent. Thus, as soon as the contact patch length, or area, of one of the tires exceeds ten percent of the contact patch length, or area, of the second tire on the axle, a warning will be sent to the driver, asking him to check the pressure of their tires.

In the case of FIG. 3d, only the tire 510 situated on the right-hand side of the axle 501 of the tractor unit is in an underpressure situation. Since the tires are twin-mounted tires, the increase in contact patch length or area as a result of underpressure in one of the twin-mounted tires will be distributed between the two tires on the side affected by the underpressure. Thus, even if a single tire 510 is in an underpressure situation, it is clearly the contact patch length, and area, of the tires 510 and 511 which will increase, up to a length L13, as shown in FIG. 3d.

The sensitivity to a possible underpressure of a tire is thus largely less than the cases in which the axle is equipped with a single-mounted tire.

In this case, it is beneficial to carry out the analysis on the basis of contact patch length and area readings obtained under high load conditions on said twin-mounted axle. In this way, the increase in contact patch length or area will be more sensitive and it will become possible to warn the driver with less risk of false alarm.

As a in the previous cases, an effect of poor load distribution between the left and the right of the trailer hitched to the tractor unit, the drive axle of which is subject to a contact patch length or surface analysis, can change the conclusion and lead to a false alarm.

In order to remedy this problem, the decision can be taken, as in the previous cases, to warn the driver only when the comparison of the contact patch lengths of the tires situated on either side of the axle results in a difference greater than x %, the coefficient x being fixed taking the type of freight transported by the vehicle in question into account.

For example, in the case of tanker transport, it is not possible to have poor load distribution between the right and the left of the train. In this case, the coefficient x may be less than in situations in which poor load distribution between the left and the right is possible.

The invention claimed is:

1. An apparatus-implemented method for detecting an underinflation state of a tire fitted on a vehicle, the method comprising steps of:
   determining, by a sensor, a first contact patch measurement of a first tire fitted on the vehicle;
   determining, by a sensor, a second contact patch measurement of a second tire fitted on the vehicle;
   comparing, by an electronic component, the first and second contact patch measurements; and
   inferring, by the electronic component, an underinflation situation if a difference between the first and second contact patch measurements, as determined by the comparing, is greater than a predetermined signaling threshold,
   wherein before the comparing, (a) a greater one of the first and second contact patch measurements is determined, and (b) the greater one of the first and second contact patch measurements is corrected by being multiplied by a value less than one before being used in the comparing, and
   wherein the value less than one is determined in accordance with information read from an RFID chip associated with a tire of the vehicle.

2. The method according to claim 1, wherein each of the first contact patch measurement and the second contact patch measurement includes at least one of: a contact patch length measurement and a contact patch area measurement.

3. The method according to claim 1, further comprising a step of sending a warning signal to at least one of: a driver of the vehicle and a remote server.

4. The method according to claim 3, wherein the step of sending a warning is implemented after several successive detections of an underinflation situation.

5. An apparatus-implemented method for detecting an underinflation state of a tire fitted on a vehicle, the method comprising steps of:
   determining, by a sensor, a first contact patch measurement of a first tire fitted on the vehicle;

determining, by a sensor, a second contact patch measurement of a second tire fitted on the vehicle, wherein the vehicle includes at least one axle with the first tire and the second tire twin-mounted on a first side of the vehicle and third and fourth tires twin-mounted on a second side of the vehicle;

determining third and fourth contact patch measurements of the third and fourth tires;

calculating a first average of the contact patch measurements of the first and second tires situated on the first side of the vehicle;

calculating a second average of the contact patch measurements of the third and fourth tires situated on the second side of the vehicle; and comparing, by an electronic component, the first and the second averages to determine a side of the vehicle that has a tire in an underinflation situation, wherein (a) a condition is satisfied wherein before the comparing, a multiplicative corrective factor less than one is applied to a greater one of two contact patch measurements before that patch measurement is averaged, the multiplicative factor less than one being determined in accordance with information read from an RFID chip associated with a tire of the vehicle, or (b) a condition is satisfied wherein before the comparing, a multiplicative corrective factor less than one is applied to one but not the other of the first average and the second average before that average is used in the comparing, the multiplicative factor less than one being determined in accordance with information read from an RFID chip associated with a tire of the vehicle.

6. The method according to claim 5, further comprising a step of comparing the contact patch measurements of the tires situated on the side of the vehicle determined to have the tire in the underinflation situation, in order to determine which tire is in an underinflation situation.

7. The method according to claim 5, wherein the corrective factor is determined based on an activity of the vehicle.

8. The method according to claim 7, wherein condition (a) is satisfied.

9. The method according to claim 5, wherein the corrective factor is determined based on a mounting status of a corresponding tire of the vehicle.

10. The method according to claim 9, wherein condition (b) is satisfied.

11. The method according to claim 5, wherein the corrective factor is determined based on a position of a corresponding tire of the vehicle.

12. The method according to claim 5, wherein condition (a) is satisfied.

13. The method according to claim 5, wherein condition (b) is satisfied.

14. An apparatus-implemented method for detecting an underinflation state of a tire fitted on a vehicle, the method comprising steps of:

determining, by a sensor, a first contact patch measurement of a first tire fitted on the vehicle;

determining, by a sensor, a second contact patch measurement of a second tire fitted on the vehicle, wherein the vehicle includes at least two axles, the vehicle includes a third tire and a fourth tire mounted on the at least two axles, and the at least two axles do not have twin-mounted tires thereon; for all of the tires mounted on the at least two axles, determining a contact patch measurement for each of the tires;

calculating a first average of contact patch measurements of tires situated on a first side of the vehicle;

calculating a second average of contact patch measurements of tires situated on a second side of the vehicle; and comparing, by an electronic component, the first and the second averages to determine a side of the vehicle that has a tire in an underinflation situation, wherein (a) a condition is satisfied wherein before the comparing, a multiplicative corrective factor less than one is applied to a greater one of two contact patch measurements before that patch measurement is averaged, the multiplicative factor less than one being determined in accordance with information read from an RFID chip associated with a tire of the vehicle, or (b) a condition is satisfied wherein before the comparing, a multiplicative corrective factor less than one is applied to one but not the other of the first average and the second average before that average is used in the comparing, the multiplicative factor less than one being determined in accordance with information read from an RFID chip associated with a tire of the vehicle.

15. The method according to claim 14, further comprising a step of comparing the contact patch measurements of the tires situated on the side of the vehicle determined to have the tire in the underinflation situation, in order to determine which tire is in an underinflation situation.

16. The method according to claim 14, wherein the corrective factor is determined based on an activity of the vehicle.

17. The method according to claim 14, wherein the corrective factor is determined based on a mounting status of a corresponding tire of the vehicle.

18. The method according to claim 14, wherein the corrective factor is determined based on a position of a corresponding tire of the vehicle.

19. The method according to claim 14, wherein condition (a) is satisfied.

20. The method according to claim 14, wherein condition (b) is satisfied.

* * * * *